(12) United States Patent
Hirokawa

(10) Patent No.: US 8,983,359 B2
(45) Date of Patent: Mar. 17, 2015

(54) IMAGE-CAPTURING APPARATUS AND IMAGE-CAPTURING SYSTEM

(75) Inventor: Hiroyuki Hirokawa, Minamikoma-gun (JP)

(73) Assignee: Nisca Corporation, Minamikoma-gun (JP)

( * ) Notice: Subject to any disclaimer, the term of this patent is extended or adjusted under 35 U.S.C. 154(b) by 906 days.

(21) Appl. No.: 12/262,163

(22) Filed: Oct. 30, 2008

(65) Prior Publication Data

US 2009/0109504 A1 Apr. 30, 2009

(30) Foreign Application Priority Data

Oct. 30, 2007 (JP) ................................. 2007-282041

(51) Int. Cl.
*G03G 15/00* (2006.01)
*H04N 1/00* (2006.01)
(52) U.S. Cl.
CPC ....... *H04N 1/00519* (2013.01); *H04N 1/00554* (2013.01); *H04N 1/00557* (2013.01)
USPC .......................................... 399/380; 399/367
(58) Field of Classification Search
CPC ................... G03G 2215/00713; B41J 29/58
USPC .................... 399/380, 113, 107, 411
See application file for complete search history.

(56) References Cited

U.S. PATENT DOCUMENTS

| | | | | |
|---|---|---|---|---|
| 5,077,585 | A * | 12/1991 | Watanabe et al. ............. | 399/367 |
| 7,050,204 | B1 * | 5/2006 | Sato et al. ..................... | 358/471 |
| 2002/0061212 | A1 * | 5/2002 | Tanaka ......................... | 399/379 |
| 2003/0103334 | A1 * | 6/2003 | Yun ............................... | 361/724 |
| 2005/0115025 | A1 * | 6/2005 | Minaguchi et al. ............. | 16/259 |
| 2006/0099007 | A1 * | 5/2006 | Uchida ......................... | 399/107 |
| 2006/0222435 | A1 * | 10/2006 | Ha et al. ........................ | 400/691 |
| 2007/0047028 | A1 * | 3/2007 | Hashimoto et al. ........... | 358/498 |

FOREIGN PATENT DOCUMENTS

| | | | | |
|---|---|---|---|---|
| JP | 2004151181 A | * | 5/2004 | ............... B41J 29/54 |
| JP | 2005-210624 A | | 8/2005 | |
| JP | 2006-042003 A | | 2/2006 | |

* cited by examiner

*Primary Examiner* — Ren Yan
*Assistant Examiner* — Ruben Parco, Jr.
(74) *Attorney, Agent, or Firm* — James W. Judge

(57) ABSTRACT

The present invention prevents units from becoming unbalanced and falling over when an image-capturing unit is opened over an image-forming unit when an image-forming unit, image-capturing unit and document-feeding unit are stacked over each other in order. The image-capturing unit is rotatably linked to the top of the image-forming unit by a first hinge means, and the document-feeding unit having document-feeding means is rotatably linked to the top of the image-capturing unit by second hinge means. Locking means for checking rotation (opening operation of the document-feeding unit) of the second hinge means is disposed on an opposite side of the second hinge means sandwiching the document-feeding means. The locking means is composed to check the opening operation of the second hinge means when the first hinge means is opened.

9 Claims, 8 Drawing Sheets

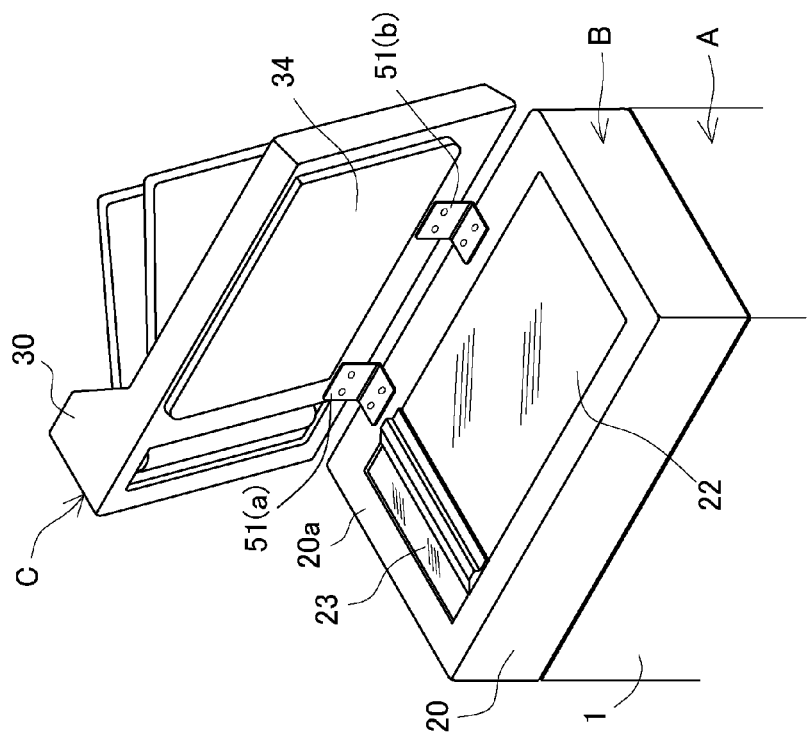
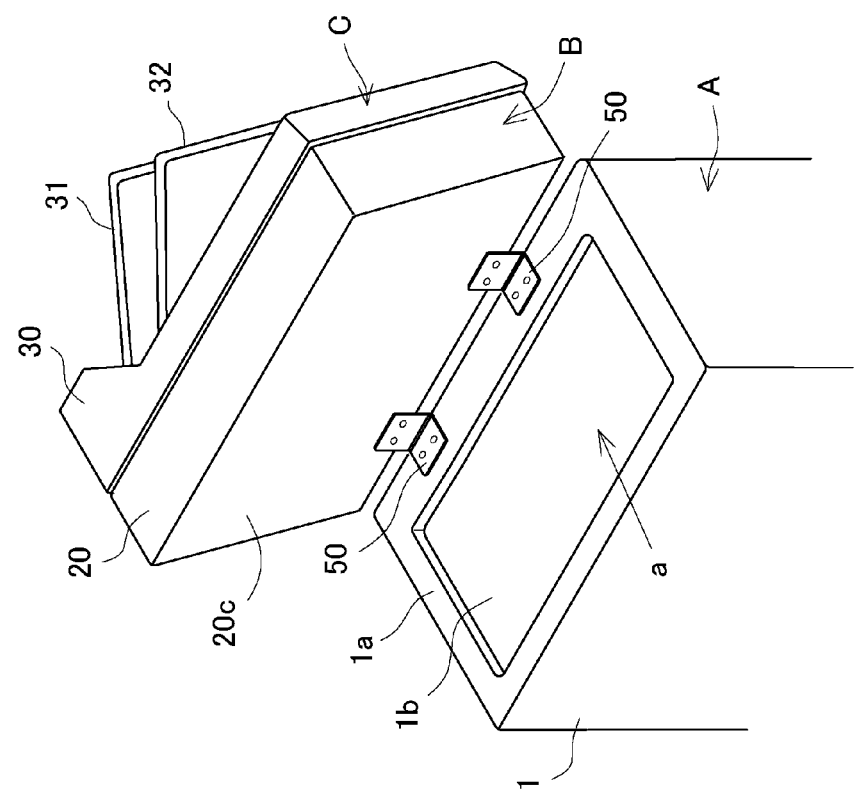

IMAGE-CAPTURING APPARATUS AND IMAGE-CAPTURING SYSTEM

BACKGROUND OF THE INVENTION

1. Technical Field

The present invention relates to image-forming systems furnished with: a printer, copier, or like image-forming unit; an image-capturing unit that transfers image information to the image-forming unit; and a document-feeding unit that feeds document original sheets to the capturing unit.

2. Description of the Related Art

Generally, image-forming systems that are composed of an imaging device (printer unit) that forms images on sheets, an image-capturing device (scanner unit) that supplies image data to the imaging unit, and a document-feeding unit (ADF unit) that feeds document-original sheets to the image-capturing apparatus, and that in the scanner unit capture images on document sheets fed from the ADF unit and form images in the printer unit are the widely known image-forming systems of this type.

For this sort of image-forming system, layout configurations—such as disclosed, for example, in Japanese Unexamined Pat. App. Pub. No. 2006-42003—wherein the scanner unit is installed above the printer unit and the ADF is installed above the scanner unit are known. In this patent reference a layout is disclosed in which the installation is stacked by turns upward by disposing the discharge tray over the printer housing, installing the scanner unit above the discharge tray, and then disposing the ADF unit over the scanner housing. This configuration is designed to make the installation space for the system overall smaller, and to improve its operability at the same time.

Openably mounting the scanner unit on the printer unit with hinge members, and openably mounting the ADF unit on the scanner unit with, again, hinge members is known. In this way openably joining each unit onto the printer housing makes it possible to rotate the overhead scanner upward when a need to clear open the area over the housing has arisen for maintenance purposes such as removing jammed paper or replacing parts. Likewise, when the upper part of the scanner housing is swung open, the ADF unit can be rotated upward on the hinges.

However, when the scanner unit is rotated around the hinge members, a problem arises in that the ADF unit disposed above the scanner unit is thereby also rotated (opened). For that reason, the above-cited patent reference proposes providing locking means between the scanner unit and the ADF unit to prohibit it from coming open due to the rotation of the ADF unit when the scanner unit is rotated upward. The locking means is configured to check the ADF from moving open on the hinges between the ADF unit and the scanner unit when the scanner unit is opened on the printer unit.

As described above, for implementations where above the printer unit, the scanner unit, and above it, the ADF unit, are respectively joined by hinges allowing them to open/close, locking mechanisms, as in the above-cited reference, that co-operate with the opening/closing action of the scanner unit to restrict the open/close moving of the ADF unit are known.

However, in the above-cited patent reference, the locking mechanism is disposed on the same side (in the embodiments, the rear side of the units) as the location where the hinges linking the scanner unit and ADF unit are disposed. The locking mechanism is configured to check the movement of the ADF unit opening by causing a lever (second rotating member 50) disposed on the scanner unit side to engage with a member (a stepped part 56) projecting from the ADF unit. Consequently, with the ADF unit in the locked state, when the front side is grasped to lift the ADF unit upward, an extremely large force (moment) is applied to the engaging portions of the locking mechanism (in other words, the engaging portions of the stepped part 56 and the second hook 52 of the second rotating member 50), which risks damaging the locking mechanism.

BRIEF SUMMARY OF THE INVENTION

There, the inventors came upon the idea of disposing the hinges on one side of the units and the locking mechanism on the other side to link the scanner unit and ADF unit using hinges so that the locking mechanism is not damaged when the user opens or closes the units.

An object of the present invention is to provide an image-forming system that can be setup in a stable manner without the weights of the units becoming unbalanced when the housing top portion of each unit is opened, has a low possibility of becoming damaged because of the opening operation, and is highly durable, when each of the units for image forming, image-capturing, and document-feeding or disposed longitudinally.

To attain the aforementioned object, the present invention openably links an image-capturing unit above an image-forming unit and a document-feeding unit above that using a first and a second hinge means. A feature of the present invention is that a second hinge means is disposed on one side and locking means that checks the hinge rotation is disposed on another side sandwiching the document-feeding means of the document-feeding unit in the following manner.

An image-forming system composed of an image-forming unit that forms images on sheets; an image-capturing unit openably linked to the image-forming unit, that reads original images; and a document-feeding unit that is openably linked to the image-capturing unit comprises a first hinge means disposed on a housing of the image-forming unit that openably links the image-forming unit to the image-capturing unit; a second hinge means disposed on a housing of the image-capturing unit that openably links the image-capturing unit to the document-feeding unit, and document-feeding means disposed on the document-feeding unit that feeds originals to an original scanning platen disposed in the image-forming unit. The first hinge means and the second hinge means are disposed on each housing on the same side with regard to the scanning platen, and the locking means that checks the opening operation by the second hinge means is provided between the image-capturing unit and the document-feeding unit. The locking means is configured to engage and disengage to check the opening operation of the second hinge means when the first hinge means is in an opened state, and is disposed on an opposite side sandwiching the document-feeding means.

A document placement platen for placing the original is disposed on the housing top portion of the image-capturing unit parallel to a scanning platen; the second hinge means is composed of a first hinge member disposed on a side of the scanning platen, and a second hinge member disposed on a side of the document placement platen; the locking mechanism is disposed on an opposite side of the first hinge member sandwiching the document-feeding means.

The locking means is composed of a fixed interlocking member disposed on either the image-capturing unit or the document-feeding unit, and a movable interlocking member disposed on the other unit; the movable interlocking member engages the fixed interlocking member when the first hinge means is opened, and disengages it when closed.

The locking means is equipped with a sliding member that follows the opening operation of the first hinge means and a transmission member that transmits the motion of the sliding member to the movable interlocking member.

The movable interlocking member is disposed where a portion overlaps a first hinge member at least in an original scanning direction of the scanning platen.

The document-feeding unit is composed of a sheet feeding tray that stores originals, a document-feeding means that feeds the originals from the sheet feeding tray to the scanning platen, and a discharge tray that stores the originals from the scanning platen; the sheet feeding tray and discharge tray are disposed substantially in parallel one over the other, and to turn over the originals from the sheet feeding tray and store them in the discharge tray.

The image-forming unit is composed of a scanning platen for reading images on an original conveyed from the document-feeding unit, a document placement platen for reading images on the original placed on that platen and image-capturing means for reading images on the original on the scanning platen or document placement platen.

Effects of the Invention

The present invention openably links an image-capturing unit above an image-forming unit and a document-feeding unit above that using first and second hinge means. Also, a second hinge means is disposed on one side and locking means that checks the hinge rotation is disposed on another side sandwiching the document-feeding means of the document-feeding unit so the following effects are attained.

The image-capturing unit and the document-feeding unit are openably linked by hinge means on one side via the document-feeding means, and locking means that controls the opening and closing operations of the hinge means is disposed on another side so that the force acting on the locking means is lightened compared to when it is disposed on the same side as the center of the hinge, and there is no worry of malfunctioning or damaging the locking mechanism. Therefore, even if the image-capturing unit is forcefully opened or closed on the document-feeding unit by the operator, there is no excessive force applied to the locking means and it is possible to prevent damaging the locking means or causing it to malfunction.

Also, when controlling the engaging and disengaging of the locking means using interlocking members disposed between the image-capturing unit and the image-forming unit, the interlocking members must be disposed on opposite sides far from the center of the hinge, and it is possible to engage and disengage the locking action by accurately interlocking with the opening and closing actions. Therefore, this does not invite accidents such as the entire set of units falling over by the document-feeding unit being carelessly rotated around the hinge because locking means failed to engage because of backlash or component precision.

Still further, because the hinge means and locking means are disposed on opposite sides sandwiching the document-feeding means, the hinge means and locking means (movable interlocking member and fixed interlocking member) are disposed on both sides of the document-feeding means equipped with a heavy and robust unit housing such as a mechanism for conveying originals, and it is possible to have a robust and solid locking mechanism that controls the opening and closing mechanism and those operations.

In such a case, an even more robust and solid opening mechanism is possible by disposing a movable interlocking member and hinge member to overlap a portion at least in the original scanning direction of the scanning platen.

BRIEF DESCRIPTION OF THE SEVERAL VIEWS OF THE DRAWINGS

FIG. 2A is explanatory view of a top portion of the image-forming unit opened in the system shown in FIG. 1;

FIG. 2B is an explanatory view of the top portion of the image-capturing unit opened;

DETAILED DESCRIPTION OF THE INVENTION

Figure 1:
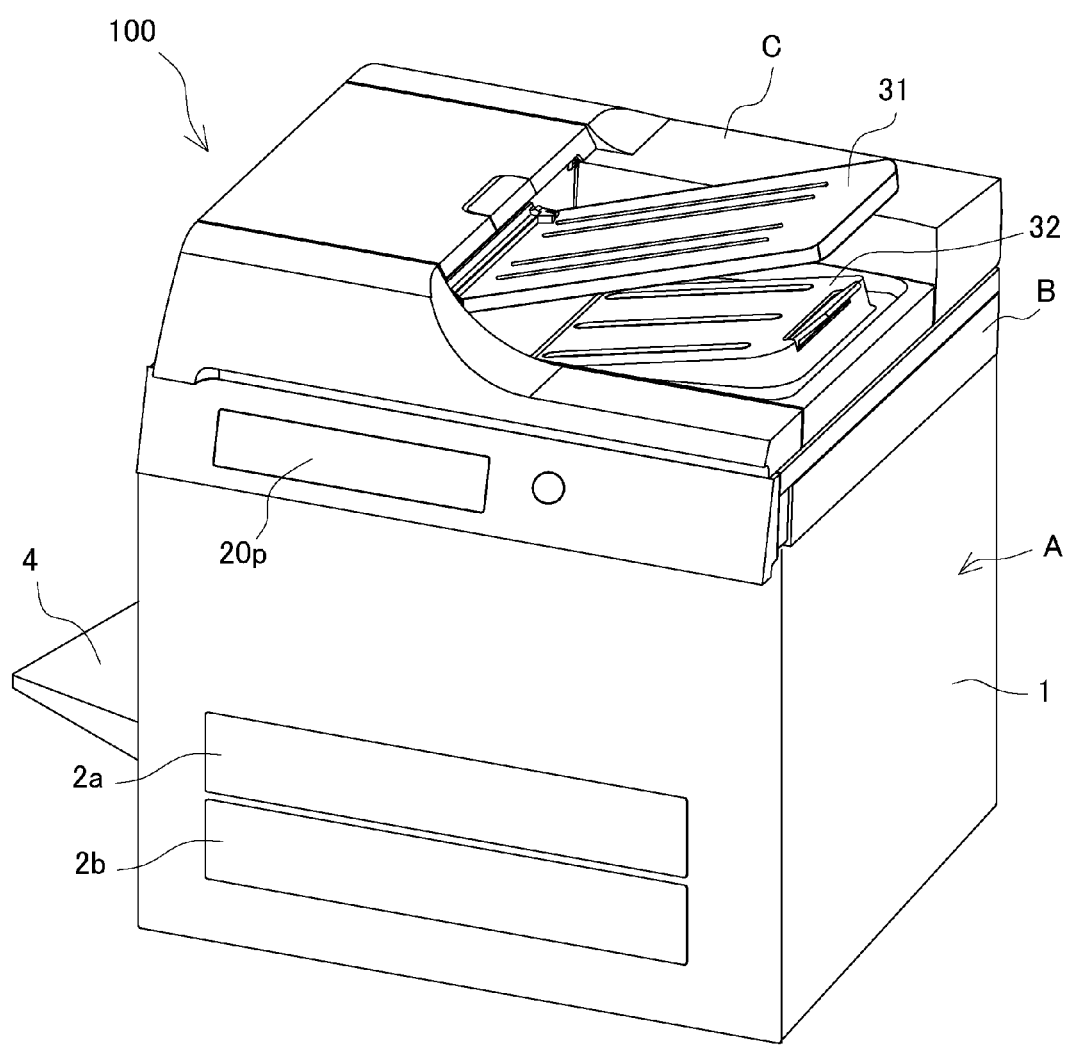
FIG. 1 is an explanatory view of an overall configuration of an image-forming system according to the present invention.
Figure 3:
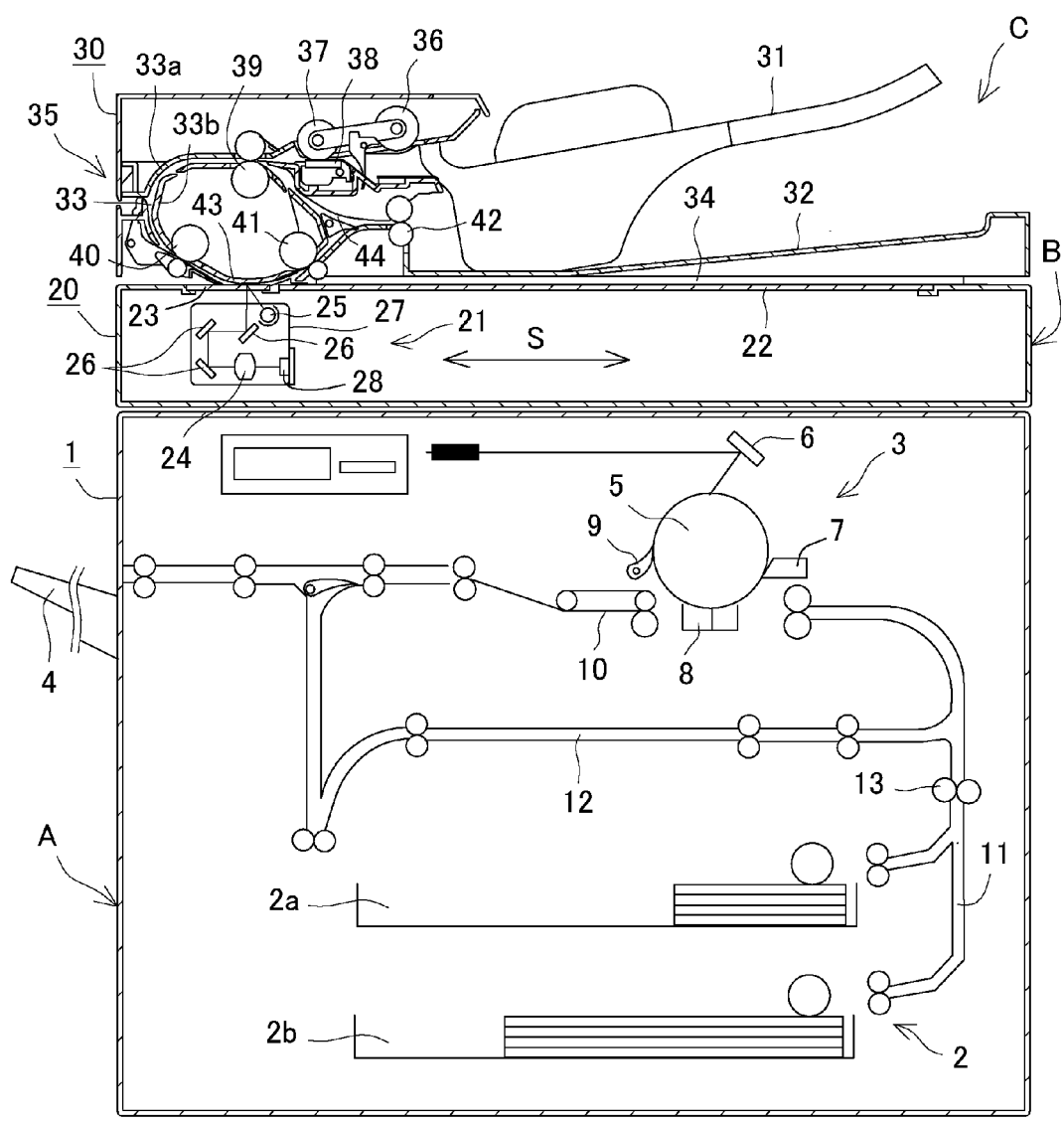
FIG. 3 is an explanatory view of a sectional structure of a document-feeding unit in the system shown in FIG. 1.
Figure 4:
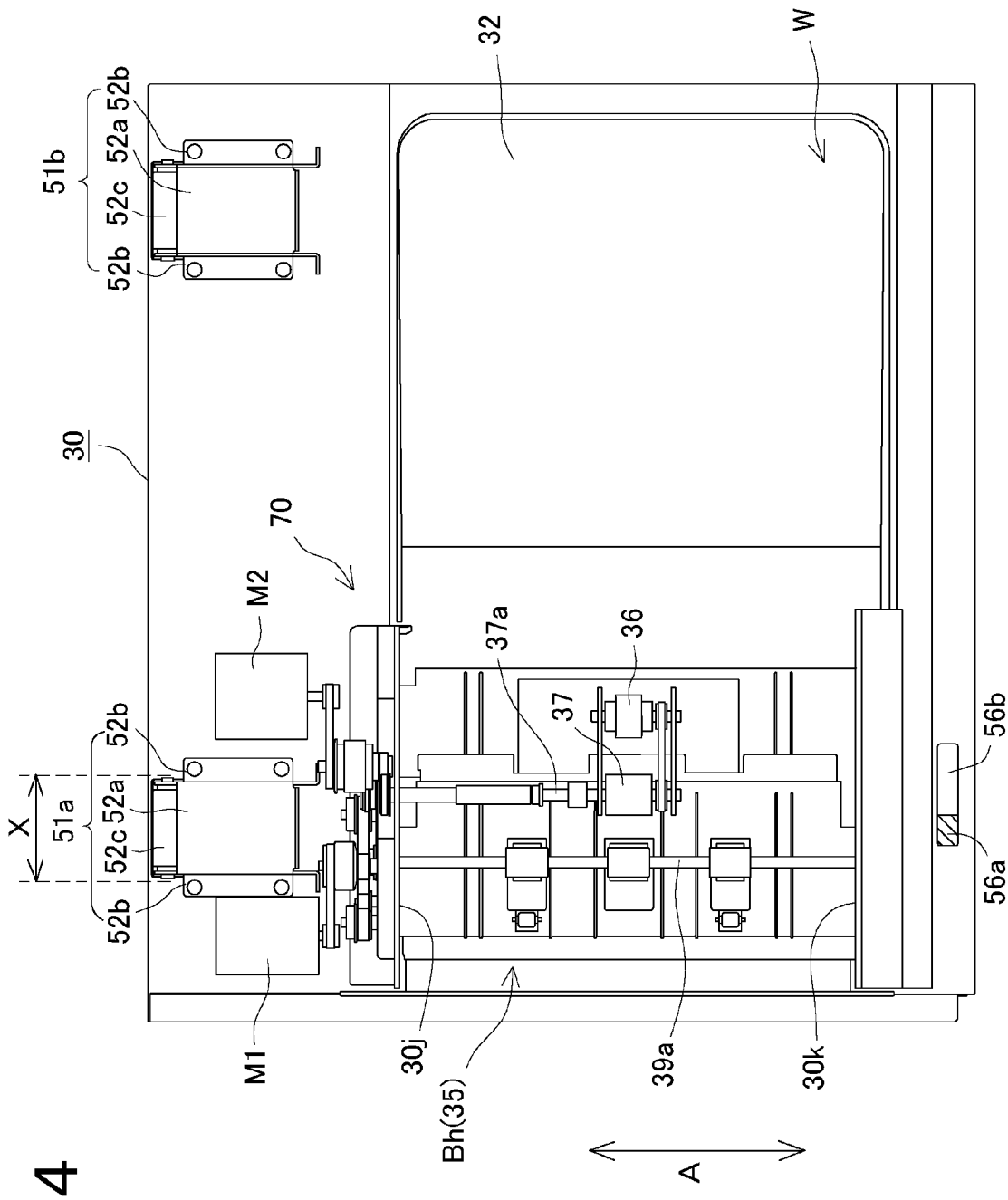
FIG. 4 is a plan view of the structure of the essential portion in the system shown in FIG. 3.
Figure 5:
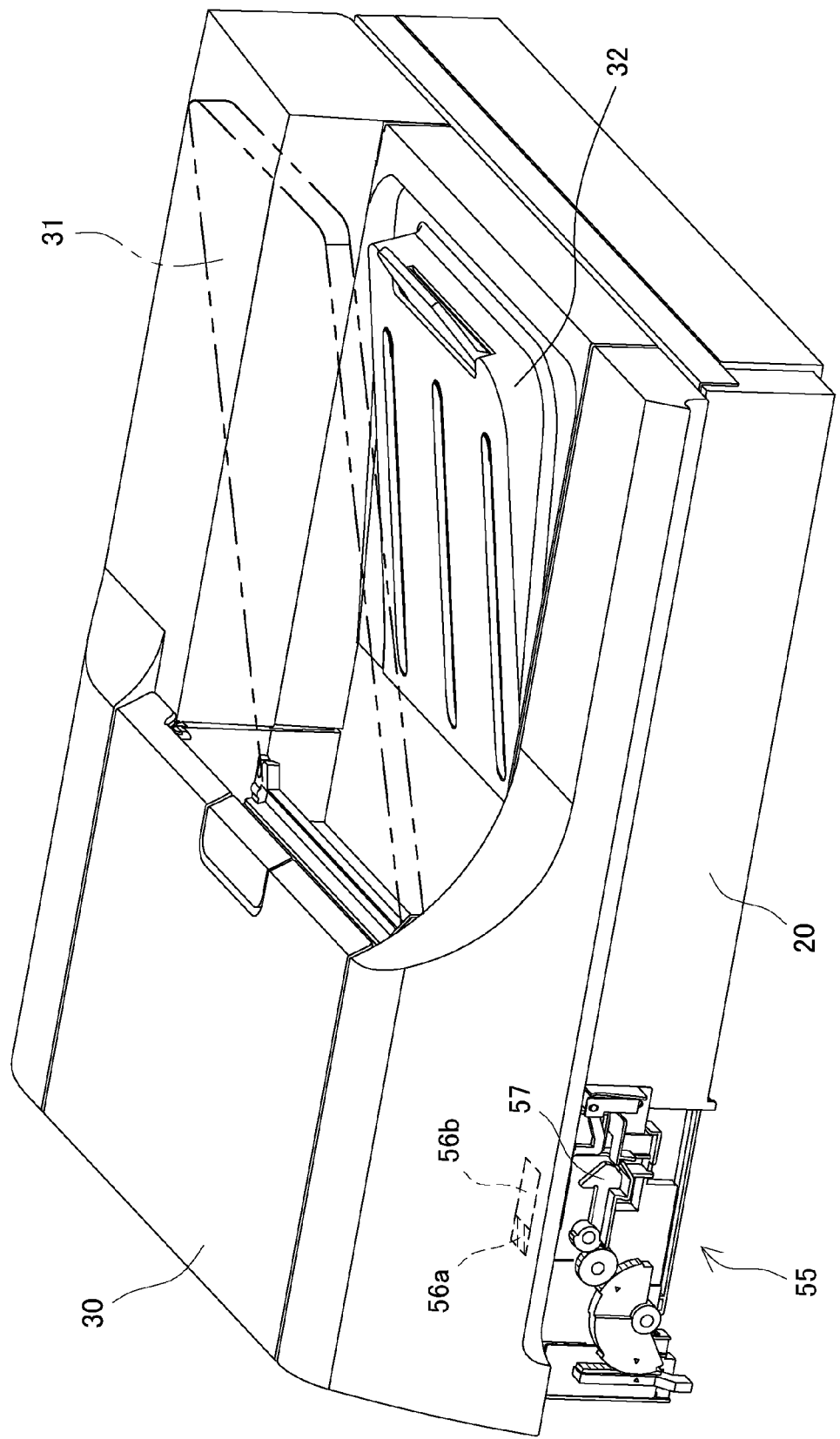
FIG. 5 is an explanatory view of a disposed structure of a locking means in the system shown in FIG. 3.

The present invention will now be explained based on a preferred embodiment with reference to the drawings provided. FIG. 1 shows an overall perspective view of the image-forming system according to the present invention; FIG. 2A is an explanatory view showing the document-feeding unit open over the image-forming unit exposing the image-forming unit; and FIG. 3 is a sectional view of the system shown in FIG. 1. FIG. 4 shows a plan view of the structure of the essential portion of the system shown in FIG. 3; and FIG. 5 shows the configuration structure of the locking means.

Configuration of the Image-Forming Unit

As shown in FIG. 1, the image-forming system 100 is composed of the image-forming unit A that forms images on sheets; the image-capturing unit B disposed above the image-forming unit A, that reads original images; and the document-feeding unit C disposed above the image-capturing unit B, that conveys the originals.

As shown in FIG. 3, the image-forming unit A is equipped with sheet supply means 2 and image-forming means 3 in the casing (hereinafter referred to as A unit housing), and is configured to form images on sheets conveyed from the sheet supply means 2 at the image-forming means 3 and to store the sheets in a discharge tray 4.

The sheet supply means 2 is configured to kick out a sheet from either one of cassette 2a or 2b and feed the sheet to the sheet conveyance path 11. The image-forming means 3 is configured to use an electrostatic printing method, ink-jet printing method, offset printing method or other printing method to form images on sheets conveyed via the sheet conveyance path 11. The unit shown in the drawing adopts an electrostatic printing method that forms latent images on an electrostatic drum 5 and transfers toner ink on the latent image to the sheet surface. For that reason, a print head 6 such as a laser emitter, a developer 7, a charger 8, and cleaner 9 are disposed around the periphery of the electrostatic drum 5.

The surface of electrostatic drum 5 is composed of photo-sensitive material, and is configured to form electrostatic latent images using laser light, LED light, or light reflected from the original image. The print head 6 disposed opposite to the electrostatic drum 5 is composed of a scanning mechanism such as the laser emitter and a polygon mirror, and is configured to form latent images on the drum. Image data received from an image data storage unit (not shown) is electrically supplied to the print head 6.

Reference numeral 12 denotes a recirculation path. Sheets conveyed from a fuser 10 are turned over from front to back and conveyed again to the image-forming means 3 to enable duplex printing that forms images on both the front and back sides of the sheet. Reference numeral 13 in the drawing denotes a registration roller disposed in the sheet conveyance path 11 upstream of the electrostatic drum 5. This temporarily idles the sheet conveyed from the sheet supply cassette 2a (or 2b), and supplies the sheet to the electrostatic drum 5 at a sheet supply timing signal.

An opening 1b is provided in the top portion of the unit of the A unit housing 1, as shown in FIG. 2A. This is configured so that maintenance of the electrostatic drum 5 inside or other components is possible from this opening 1b. The image-capturing unit B, described below, is linked by hinge means (first hinge means 50 described below) to the housing top portion 1a that forms the opening portion 1b. Therefore, the opening portion 1b formed in the housing top portion 1a of the image-forming unit A is openably covered by the image-capturing unit B.

Configuration of the Image-Capturing Unit

The image-capturing unit B, a sectional view thereof shown in FIG. 3, is composed of a casing 20, and image-capturing means 21 disposed therein. The casing (hereinafter referred to as B unit housing) 20 is made of a synthetic resin and formed into a suitable box shape. A control panel 20p (see FIG. 1) is disposed on the front side of the B unit housing (front side of FIG. 1). The rear side of the B unit housing 20 is openably attached to the image-forming unit by the first hinge means 50 on the top portion of the image-forming unit A housing. As shown in FIG. 2B, two platens are established in parallel on the housing top portion 20a of the B unit housing 20. A first platen 22 is a document placement platen for placing an original thereupon; a second platen 23 is a scanning platen 23 that reads the original as it is conveyed at a predetermined speed by document-feeding unit C. The first platen 22 and the second platen 23 are formed using a transparent material such as glass and the like and are mounted on the top surface of the B unit housing 20 formed using a synthetic resin.

The image-capturing means 21 that reads images on originals at each platen is equipped with a carriage 27 supported to reciprocate along the first platen 22. The carriage 27 supports a lamp 25 that irradiates light onto the original, mirrors 26 that reflect light from the original, a lens 24 that converges light from the mirrors 26, and an image sensor 28 that reads images by photoelectrically converting the light from the original converged by the lens 24. The image sensor 28 is composed of a plurality of photoelectrical conversion elements such as CCD elements for example disposed in a line. The longitudinal direction of the image sensor 28 (specifically, a direction perpendicular to the sheet surface shown in FIG. 3) is the main scanning direction, and the carriage 27 movement direction indicated by arrows S in FIG. 3 and the original conveyance direction are the sub-scanning direction.

When reading the original conveyed by the document-feeding unit C, the carriage 27 reads the original by being stationary under the second platen 23. When reading the original placed on the first platen 22, the original is read while the carriage 27 is moved in the sub-scanning direction along the first platen 22. Electrical signals output from the image sensor 28 are output to the image-forming unit as image data after A/D conversion and various image processes have been completed.

The image-capturing unit B configured in this way is openably mounted to the housing top portion 1a of the image-forming unit A described below by the first hinge 50 described below, as shown in FIG. 2A. The opening portion 1b formed in the top portion of the image-forming unit A is configured to be openably covered by a bottom surface 20c of the image-capturing unit B.

Document-Feeding Unit

As shown in FIGS. 3 and 4, the document-feeding unit C is equipped with a conveyance path 33 incorporated in the casing (hereinafter referred to as the C unit housing) 30, a document-feeding means 35, a sheet supply tray 31, discharge tray 32, and a platen cover 34. The originals placed on the sheet supply tray 31 are conveyed one at a time to the second platen 23 by the document-feeding means 35. After images on the original are read at the second platen 23, the original is conveyed to and stored in the discharge tray 32. Also, the platen cover 34 presses and holds the original sheet placed on the first platen 22 described above.

Configuration of the Original Conveyance Means

The sheet supply tray 31 and discharge tray 32 are disposed one over the other as shown in FIG. 3. The conveyance path 33 is composed of sectionally U-shaped path to guide the original from the sheet supply tray 31 to the discharge tray 32 via the second platen 23; the document-feeding means 35 is disposed in this conveyance path 33. Note that the conveyance path 33 is formed by a sectionally U-shaped outer conveyance guide 33a and an inner conveyance guide 33b. The document-feeding means 35 is equipped with a pickup roller 36, sheet feeding roller 37, registration rollers 39, read roller 40, conveyance out roller 41, and discharge roller 42; the rollers are rotatingly driven by drives from the motors M1 and M2.

Originals placed on the sheet supply tray 31 are kicked out by the pickup roller 36, then separated single sheets by the sheet feeding roller 37 and a separating pad 38 and fed downstream.

The original separated into a single sheet and conveyed downstream by the sheet feeding roller 37 has any skew removed by a leading edge of the original abutting the nipping point of the registration rollers 39 that are in a stopped state to cause the sheet to form a registration loop. Then, the original is conveyed further downstream by the rotation of the registration rollers 39. The original is conveyed along the second platen 23 by the rotation of the read roller 40, and is read at a reading position 43, then discharged to the discharge tray 32 by the rotation of the discharge roller 42. 44 denotes a recirculation path used to turn the original over from front to back when conducting duplex reading. Also, a plurality of sensors, not shown, that detect either a leading edge or a trailing edge of the original to detect the original position is disposed in the conveyance path 23.

The document-feeding means 35 that conveys the original to the second platen 23 is composed of this conveyance path 33 and each of the rollers (sheet feeding roller 37, registration roller 39, read roller 40, conveyance out roller 41, and discharge roller 42) disposed in that path. Also, this document-feeding means 35 and platen cover 34 are built-in to the casing (C unit housing) 30. As is clearly shown in FIG. 3, the document-feeding means 35 is disposed over the second platen 23, and the platen cover 34 is disposed over the first platen 22. Also, the sheet supply tray 31 and discharge tray 32 associated with the document-feeding means 35 are disposed above the platen cover 34.

Configuration of the Original Conveyance Unit Housing

The housing structure will now be explained based on a plan view of the essential portion of the document-feeding unit C shown in FIG. 4. The unit in the drawing has the document-feeding means 35 disposed over the second platen 23 described above on the C unit housing 30, on the left side of FIG. 3, and the platen cover 34 disposed over the first platen 22, described above, on the left side of FIG. 3. Compared to the platen cover 34, the document-feeding means 35 has many components and is heavy so the document-feeding means 35 side of the C unit housing 30 is configured to be more robust compared to the platen cover 34 side. As shown in FIG. 4, the motor M1, motor M2 and a drive transmission mechanism 70 that transmits drive to each roller are disposed at the rear of the unit. Rib-shaped side walls 30j, 30k are equipped on the C unit housing integrated with synthetic resin, and a rotating shaft 37a of the sheet feeding roller 37, a drive rotation shaft 39a of the registration rollers 39 and a rotating shaft 40a, not shown, of the read roller 40 are fastened to bearings between these side walls. Still further, the resin-made inside conveyance guide 33b that forms the conveyance path 33 is disposed over the main scanning direction shown by the arrows A in FIG. 4. Although it is not shown in the drawing, the outside conveyance guide 33a is equipped over the main scanning direction in the same way.

Furthermore, the document-feeding means 35 side has a higher strength than the document-feeding means 35 itself and the C unit housing 30 that stores that than the platen cover side. The housing portion that is mounted with the mounting base of the first hinge member 51 a, described below, disposed at a backside of the document-feeding means 35 is configured to a thickness that is not easily deformed.

Configuration of the Each Unit Setup

As shown in FIG. 1, the image-forming unit A, the image-capturing unit B and the document-feeding unit C are arranged so that the image-capturing unit B is disposed on the housing top portion 1a of the image-forming unit A and the document-feeding unit C is disposed on the housing top portion of the image-capturing unit B. Also, as shown in FIG. 2, the image-capturing unit B is openably linked to the image-forming unit A by the first hinge means 50, and the document-feeding unit C is linked to the image-capturing unit B by a second hinge means 51.

The first hinge means 50 is equipped with a left and right pair on the backside in FIG. 2 (the rear side of the unit) to open upward of the opening portion of the image-forming unit A. The second hinge means 51 is disposed as a pair on the left and right sides of the backside of FIG. 1 (one edge side of the main scanning direction of the arrows A in FIG. 4) to open upward of the first platen 22 disposed on the housing top portion 20a of the image-capturing unit B.

Therefore, the image-capturing unit B is mounted to the image-forming unit A to be able to open upward from the unit front side (the front surface side shown in FIG. 1) around the first hinge means 50. In the same way, the document-feeding unit C is linked to the image-capturing unit B to be able to open upward from the unit front side around the second hinge means 51.

The first hinge member 51a of the second hinge means 51 is equipped on the second platen 23 side (the left side of FIG. 2) and the second hinge member 51b of the second hinge means 51 is equipped on the first platen 22 side (the right side of FIG. 2). The first and second hinge members 51a, 51b have different load capacities.

Configuration of the Hinge Means

Figure 6:
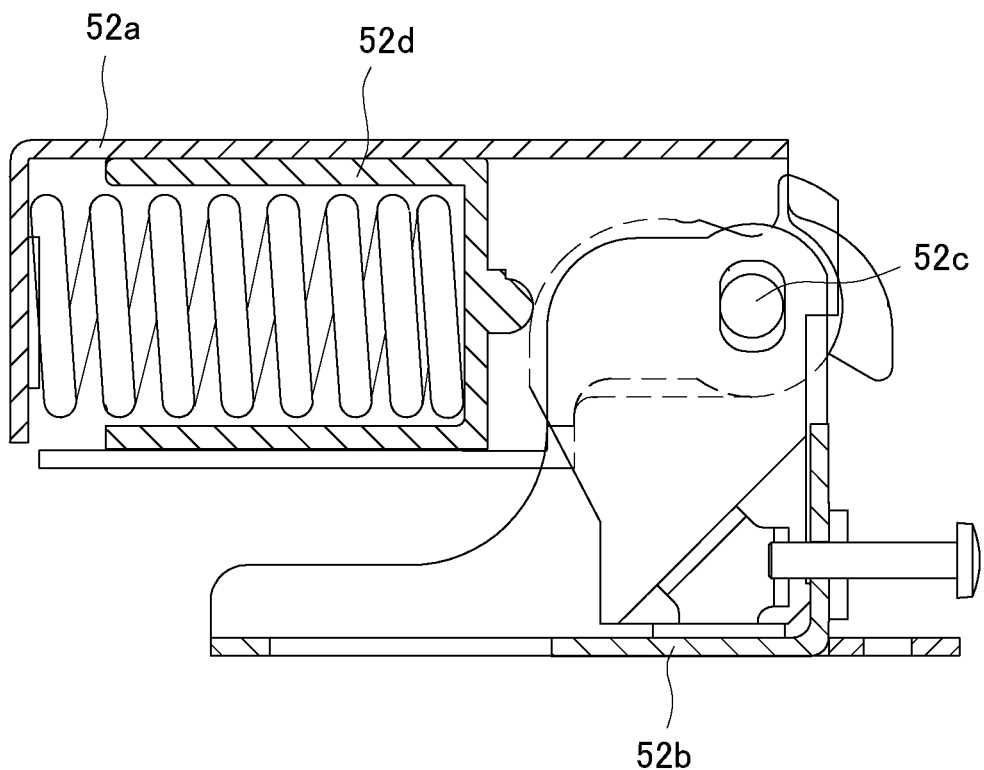
FIG. 6 is an explanatory view of the hinge means in the unit shown in FIG. 3.

The first hinge means 50 and the second hinge means 51 can each adopt a suitable hinge structure. One example is explained with reference to FIG. 6. The hinge is equipped with a top portion mounting base 52a that is mounted to the housing to be linked and a bottom potion mounting base 52b, and is composed of a hinge shaft 52c that rotatingly links the top and bottom mounting base portions 52a, 52b, and buffering spring 52d disposed between the mounting base portions 52a, 52b. Therefore, the top and bottom housings (the combination of the A unit housing 1 and B unit housing 20, and the combination of the B unit housing 20 and the C unit housing 30) each fastened with the top and bottom mounting base portions 52a, 52b by screws rotate around the hinge shaft 52c, and the operating force of opening and closing these is lightened by the buffering spring 52d.

The second hinge means 51 that links the B unit housing 20 and the C unit housing 30 is composed of buffering spring with a strong spring force for the first hinge member 51a (left side of FIG. 3) and a buffering spring with a weak spring force for the second hinge member 51b (right side of FIG. 3). The reason why the left and right side spring balances are different is because document-feeding means (document-feeding unit) 35 of the document-feeding unit C positioned on the left side of FIG. 3 is heavy, and the platen cover 34 positioned on the right side of FIG. 3 is lighter in weight. Therefore, it is preferred to vary the load capacity of the left and right hinge members 51a, 51b according to the weights. Depending on the unit configuration, only the first hinge member 51a is a buffering spring, and the second hinge member 51b can be configured without a buffering spring.

As described above, with the structure for the image-capturing unit B to be openably linked to the top portion of the image-forming unit A and the document-feeding unit C to be openably linked to the image-capturing unit B, a problem exists in that the document-feeding unit C will fall open by the rotation to open the image-capturing unit B. The present invention provides locking means, described below, between the image-capturing unit B and the document-feeding unit C.

Configuration of the Locking Means

As shown in FIGS. 4, 5, 7, and 8, the locking means 55 is disposed on a side of the front sides of the B unit housing 20 and the C unit side 30, and is composed of a fixed interlocking member 56, a movable interlocking member 57, a transmission member 58 that engages and disengages the movable interlocking member 57 by being interlocked with the opening operation of the image-capturing unit B, and a sliding member 59.

The fixed interlocking member 56 is composed of an engaging piece 56a that engages an engaging claw 57a, and is integrally formed in the C unit housing 30. An opening 56b through which the engaging claw 57a advances is provided in the C unit housing 30.

Figure 7:
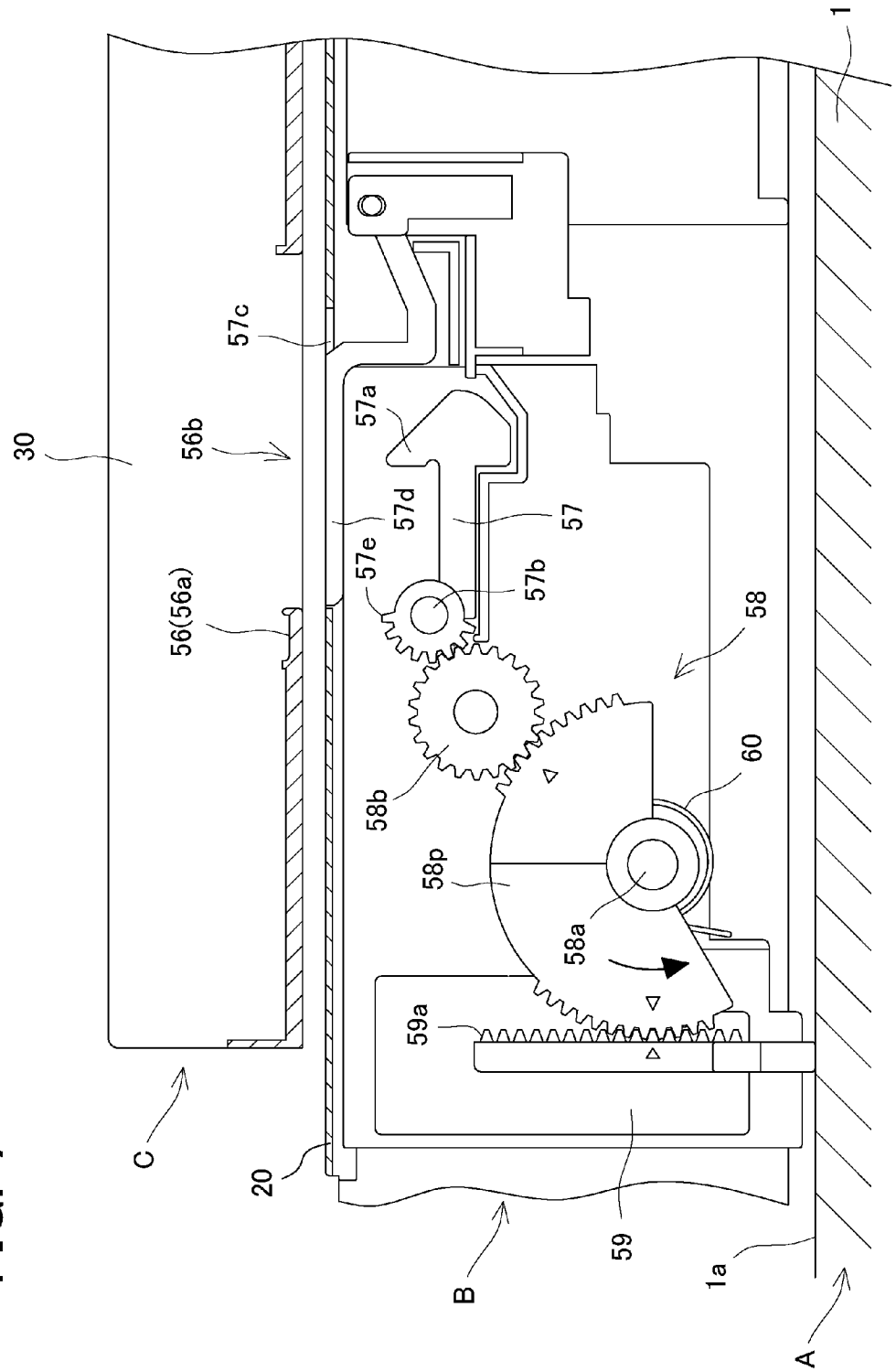
FIG. 7 is an explanatory view of a locking mechanism when the image-capturing unit is closed.

As shown in FIG. 7, the movable interlocking member 57 is equipped with the engaging claw 57a that latches onto the engaging claw 56a, and is mounted to the B unit housing 20 to be able to rotate around the bearing 57b. Also, a gear 57e is mounted to the bearing 57b.

The transmission member 58 is composed of a transmission gear 58b that meshes with the gear 57e, and a pinion 58p (a fan gear is shown in the drawing) meshes with the transmission gear 58b and rotates the rotating shaft on a shaft. The pinion 58p meshes with the rack 59a of the sliding member 59 mounted to be movable up and down. In addition, an urging force is applied to the pinion 58p by a spring 60 to constantly be turned in a counterclockwise direction indicated by the arrow FIG. 7, and a constant downward force is applied to the rack 59a to touch the leading end to the top surface 1a of the A unit housing 1.

An opening is formed in the top surface of the B unit housing 20 so that the engaging claw 57a can enter and exit therethrough. There is also a cover 57d provided in the B unit housing 20 that covers the opening 57c. A spring, not shown, is provided in the cover 57d to apply urging force on the cover 57d in a direction to close the opening 57d.

Figure 8:
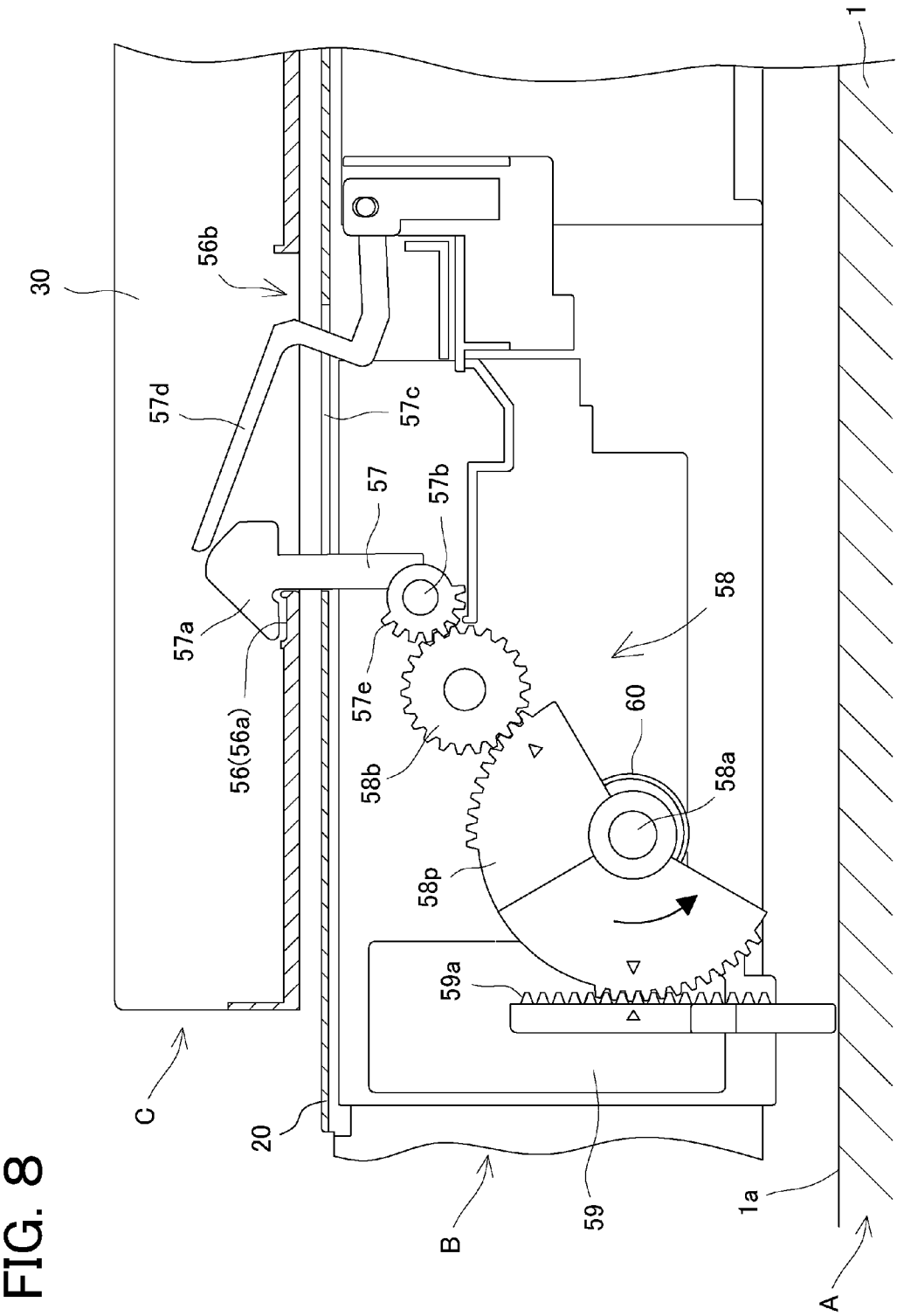
FIG. 8 is an explanatory view of the locking mechanism when the image-capturing unit is opened.

FIG. 7 shows the image-capturing unit B closed over the image-forming unit A; FIG. 8 shows the image-capturing unit B opened over the image-forming unit A.

In FIG. 7, rotation in the counterclockwise direction of the pinion 58p by the spring 60 is checked by the leading end of the rack 59a touching the top surface 1a of the A unit housing 1, the engaging claw 57a fits into the B unit housing 20 and the engaging claw 57a is disengaged from the engaging piece 56a. Therefore, when the image-capturing unit B is in a closed state, the document-feeding unit C is in a state where it can be opened over the image-capturing unit B, and the user can lift open the document-feeding unit C, as shown in FIG. 2B.

In FIG. 8, a gap is formed between the B unit housing 20 and A unit housing by the image-capturing unit B being opened. The engaging claw 57a projects the amount of that gap from the B unit housing 20 by the counterclockwise urging force of the spring 60. In other words, by the pinion 58p being rotated further in the counterclockwise direction from the state shown in FIG. 7, the transmission gear 58b is rotated in the clockwise direction and the engaging claw 57a is moved upward by the bearing shaft 57b being rotated in the counterclockwise direction. Then, the engaging claw 57a lifts the cover 57d and projects from the opening 57c to advance into the C unit housing 30 and engage the engaging piece 56a. Therefore, when the image-capturing unit B is in an opened state, the document-feeding unit C is in a state where it can be closed over the image-capturing unit B. Even if the user lifts open the B unit housing 20 as shown in FIG. 2B, the document-feeding unit C will not open.

As described above, with the present invention, the document-feeding unit C does not open even when the image-capturing unit B is opened over the image-forming unit A. Therefore, it is possible to prevent the units from tipping over by the units becoming unbalanced.

Additionally, while the second hinge means 51 is disposed on the rear side of the units, the locking means 55 described above is disposed on the front side of the units, in other words on the opposite side of the second hinge means 51. Said another way, the locking means is disposed on another edge side opposite to the second hinge means 51 disposed on one edge side (an edge side in the main scanning direction) sandwiching the document-feeding means 35. Because of this, even if the user lifts up or holds the document-feeding unit C upward when the image-capturing unit is opened, there is no large force acting on the engaging claw 57a and engaging piece 56a so the locking means is not damaged.

Furthermore, as shown in FIG. 4, the second hinge means 51 is composed of the first hinge member 51a of the second platen 23 side and the second hinge member 51b of the first platen 22 side. Also, the engaging claw 57a is positioned in the region (region X (fixed region X) in FIG. 4) between the top portion mounting bases 52b on the left and right of the first hinge members 51a.

As described above, because the document-feeding means (left sides of FIGS. 3 and 4) is heavier than the platen cover side, the housing of the document-feeding means in the document-feeding unit C is configured to be robust. It is difficult for deformation such as twisting of the housing itself to occur by force being applied in the fixed region X where the first hinge member 51a is fastened. Because of this, the document-feeding unit C is locked when the image-capturing unit B is opened so it is possible to prevent deformation such as twisting of the housing even if the user grips the document-feeding unit C and holds the image-capturing unit B in an opened state, thereby applying force to the engaging piece 56a.

The locking means 55 is composed of the fixed interlocking member 56 and the movable interlocking member 57 that mutually engage and disengage each other; one of these is disposed on the B unit housing 20 and the other is disposed on the C unit housing 30. The movable interlocking member 57 is openably linked to the B unit housing 20 and configured to engage with and disengage from the fixed interlocking member 56. The fixed interlocking member 56 disposed on the C unit housing 30 does not project downward below the bottom surface of C unit housing 30, and the because the movable interlocking member 57 disposed on the B unit housing 20 tries to project upward from the B unit housing 20 only when the image-capturing unit B is opened, this prevents the danger of the user getting fingers caught in the locking means when the image-capturing unit B is opened, in other words when it is in normal use.

Note that the first platen 22 and the second platen 23 in the present invention are each formed of different members, but these two platens can be composed of one transparent member.

This application claims priority rights from Japanese Pat. App. No. 2007-282042, which is herein incorporated by reference.

What is claimed is:

1. An image-capturing device for disposal over an image-forming unit, and furnished with an image-capturing unit for capturing image information from original documents and with a document-feeding unit, disposed over the image-capturing unit and including a document-conveyance means, for conveying the documents in a document-conveyance direction, the image-capturing device comprising:

first hinge means for supporting the image-capturing unit on, to enable the image-capturing unit to open/close against, the image-forming unit along a back side of the image-capturing device;

second hinge means for supporting the document-feeding unit on, to enable the document-feeding unit to open/close against, the image-capturing unit along the back side of the image-capturing device; and locking means, disposed along a front side of the image-capturing device, in a location flanking the document-conveyance means, for interlocking the image-capturing unit with the document-feeding unit so that the document-feeding unit does not come open when the image-capturing unit is opened against the image-forming unit, the locking means including a locking mechanism, a locking-mechanism opening formed in an upper side of the image-capturing unit and extending in the document-conveyance direction, in order for the locking mechanism to interlock the image-capturing unit with the document-feeding unit, an openable/closable cover shiftable between an uncovering position in which the locking-mechanism opening in the upper side of the image-capturing unit is exposed, and a shutting position in which the locking-mechanism opening is covered, a sliding member configured to move in response to the image-capturing unit opening/closing, and a transmission member for transmitting motion of the sliding member to a movable interlocking member thereby locking/unlocking the image-capturing unit with the document-feeding unit, wherein the locking means shifts the openable/closable cover into the uncovering position when the image-capturing unit and the document-feeding unit are interlocked by the locking mechanism, and the locking means shifts the openable/closable cover into the shutting position when the image-capturing unit and the document-feeding unit are released.

2. The image-capturing device according to claim 1, wherein:

the locking mechanism for the locking means is composed of a fixed interlocking member disposed on the document-feeding unit, and the movable interlocking member disposed on the image-capturing unit; and the movable interlocking member engages with the fixed interlocking member when the image-capturing unit is opened over the image-forming unit, and disengages from the fixed interlocking member when the image-capturing unit is closed over the image-forming unit.

3. The image-capturing device according to claim 2, wherein:

the second hinge means is constituted by a first hinge member and a second hinge member each having a spring means, with the spring means of one of the first and second hinge members being of stronger spring force than the spring means of the other of the first and second hinge members, and the first and second hinge members being disposed apart in the document conveyance direction; and the locking means is disposed across from that of the first and second hinge members whose spring-force is stronger.

4. The image-capturing device according to claim 3, wherein engaging parts of the fixed interlocking member and the movable interlocking member are disposed in a location where the engaging parts at least partially align with the first hinge member of the second hinge means in a direction orthogonal to the document-conveyance direction.

5. The image-capturing device according to claim 3, wherein the image-capturing unit comprises:

a scanning platen for the capturing of image information from documents fed there from the document-feeding unit;

a document placement platen for the capturing of image information from documents placed thereupon; and image-capturing means, supported to enable the image-capturing means to shift along the document placement platen, for capturing image information from documents on the scanning platen or the document placement platen.

6. The image-capturing device according to claim 3, wherein:

the first hinge member of the second hinge means is nearer the document-conveyance means in the document-conveyance direction and the second hinge member of the second hinge means is further from the document-conveyance means in the document-conveyance direction; and the first hinge member of the second hinge means is of greater spring-force than the second hinge member of the second hinge means.

7. The image-capturing device according to claim 2, wherein:

the locking mechanism is configured such that the openable/closable cover is shifted by the movable interlocking member in the direction in which the cover opens; and the movable interlocking member in shifting the openable/closable cover projects through the locking-mechanism opening in the upper side of the image-capturing unit and engages with the fixed interlocking member.

8. The image-capturing device according to claim 1, further comprising:

a linked-operation mechanism for actuating the locking mechanism by operatively linking with the opening/closing movement of the image-capturing unit against the image-forming unit; wherein by the image-capturing unit moving from being closed to being opened against the image-forming unit, the linked-operation mechanism actuates the locking mechanism such as to lock together the image-capturing unit and the document-feeding unit; and by the image-capturing unit moving from being opened to being closed against the image-forming unit, the linked-operation mechanism actuates the locking mechanism such as to release the locking together of the image-capturing unit and the document-feeding unit.

9. The image-capturing device according to claim 1, wherein the transmission member is constituted by gears.

* * * * *